(12) United States Patent
Dupuis et al.

(10) Patent No.: US 12,095,412 B2
(45) Date of Patent: Sep. 17, 2024

(54) ANTI-VIBRATION SYSTEM FOR A PHOTOVOLTAIC MODULE

(71) Applicant: ELECTRICITE DE FRANCE, Paris (FR)

(72) Inventors: Julien Dupuis, Bois le Roi (FR); Emmanuel Boyere, Avon (FR)

(73) Assignee: ELECTRICITE DE FRANCE, Paris (FR)

( * ) Notice: Subject to any disclaimer, the term of this patent is extended or adjusted under 35 U.S.C. 154(b) by 4 days.

(21) Appl. No.: 18/246,075

(22) PCT Filed: Sep. 14, 2021

(86) PCT No.: PCT/EP2021/075158
§ 371 (c)(1),
(2) Date: Mar. 21, 2023

(87) PCT Pub. No.: WO2022/063624
PCT Pub. Date: Mar. 31, 2022

(65) Prior Publication Data
US 2023/0361717 A1    Nov. 9, 2023

(30) Foreign Application Priority Data

Sep. 24, 2020 (FR) .................... 20 09708

(51) Int. Cl.
*H02S 30/10* (2014.01)
*H02S 40/34* (2014.01)
(52) U.S. Cl.
CPC ............. *H02S 30/10* (2014.12); *H02S 40/34* (2014.12)

(58) Field of Classification Search
CPC .......... H02S 30/00; H02S 30/10; H02S 40/00; H02S 40/34
See application file for complete search history.

(56) References Cited

U.S. PATENT DOCUMENTS

| 9,276,522 B1* | 3/2016 | Au .......................... F24S 40/85 |
| 2008/0168981 A1* | 7/2008 | Cummings ............. H02S 20/10 52/690 |
| 2017/0244356 A1* | 8/2017 | Stribling ................. H02S 30/20 |

FOREIGN PATENT DOCUMENTS

| CN | 103762934 A | 4/2014 |
| CN | 108199655 A | 6/2018 |
| CN | 108547497 A | 9/2018 |

(Continued)

OTHER PUBLICATIONS

International Search Report issued on Nov. 30, 2021, in corresponding International Patent Application No. PCT/EP2021/075158; 5 pages.

*Primary Examiner* — Golam Mowla
(74) *Attorney, Agent, or Firm* — Maier & Maier, PLLC

(57) ABSTRACT

A system composed of a photovoltaic module, itself composed of a multilayer housed in a frame and of at least one anti-vibration device that is able to be fixed with respect to the multilayer and in which the photovoltaic module as a whole has a total mass, a modal mass, and a natural frequency of vibration; the at least one anti-vibration device has: a mass, a natural frequency equal to a natural frequency of vibration of said photovoltaic module considered on its own, to within 15%, and a level of damping of the anti-vibration device considered on its own, equal to at least twice the level of damping of said photovoltaic module considered on its own.

9 Claims, 4 Drawing Sheets

(56) References Cited

FOREIGN PATENT DOCUMENTS

| | | |
|---|---|---|
| CN | 110034722 A | 7/2019 |
| CN | 110768625 A | 2/2020 |

\* cited by examiner

ANTI-VIBRATION SYSTEM FOR A PHOTOVOLTAIC MODULE

FIELD OF DISCLOSURE

The invention falls within the field of the mechanics of photovoltaic modules and of limiting the effects of vibrations amplified in particular by the resonance phenomenon.

BACKGROUND

A photovoltaic module, also called a photovoltaic panel, is conventionally composed of semiconductor cells assembled together and retained between two glass plates respectively in front and in back of the module or by glass in front and a stack of polymer layers in back (hereinafter referred to as a back sheet). These stacks of cells and glass will subsequently be referred to by the term "laminate" or "multilayer". The multilayer can be held by a frame, the overall assembly—multilayer and frame—forming what is referred to as the photovoltaic module.

It is known that photovoltaic modules are subjected to numerous environmental disturbance factors throughout the duration of their operation, such as temperature variations, humidity, ultraviolet radiation, or wind. Over the years, these disturbances cause progressive degradation of the photovoltaic modules and in particular a degradation in their performance.

Wind in particular can cause a photovoltaic module to vibrate. Under the effect of wind, static and dynamic mechanical stresses are exerted on the module, which can be deformed with an increasing amplitude of deformation and can therefore experience resonance. The stresses undergone can lead to breakage of the module's photovoltaic cells, which results in a loss of performance, a risk that hot spots will appear, and a general reduction in reliability and lifespan. These long-term inconveniences caused by wind are often poorly addressed.

Solutions are known for limiting the vibrations of a photovoltaic module, but more in the context of seismic vibrations. Other solutions aiming to increase the robustness of the module can consist of thickening the photovoltaic cells or the glass constituting the laminate.

These solutions, which aim to improve the mechanical resistance of the module cells, involve making the modules heavier and increasing the raw material and transport costs. A single photovoltaic module typically weighs between 20 and 30 kilograms. Thickening the layers in the multilayer would imply an increase in this weight, which can affect the transport or even the performance of the photovoltaic modules.

Other solutions also consist of equipping the frame of the photovoltaic module with a set of springs between the frame and its support, in order to dampen the movements undergone by the spring-mounted structure. The following documents deal with such matters: CN 108547497 (A), CN 103762934 (A).

Such solutions dampen the structure (or frame) supporting the module's multilayer and not the multilayer itself. Such systems are therefore inefficient, for example in the case of a gust of wind causing the multilayer itself to resonate, and it constitutes the central part of a photovoltaic module with the largest surface area exposed to the wind.

SUMMARY OF DISCLOSURE

This disclosure improves the situation.
A system is proposed comprising:
a photovoltaic module including a multilayer housed in a frame, the photovoltaic module as a whole having a total mass, a modal mass, and a natural frequency of vibration;
at least one anti-vibration device able to be fixed with respect to the multilayer, at least one of the at least one anti-vibration device having:
a mass,
a natural frequency equal to a natural frequency of vibration of said photovoltaic module considered on its own, to within 15%,
a level of damping of the anti-vibration device considered on its own, equal to at least twice the level of damping of said photovoltaic module considered on its own.

Such an embodiment makes it possible to increase the— naturally weak—damping of the multilayer of a photovoltaic module, and to do so intrinsically by associating them with a damping device having substantially the same natural frequency. The level of damping of the anti-vibration device can in particular be regulated by the choice of viscoelastic materials of said device.

Such a system makes it possible to attenuate the vibratory effects of gusts of wind on the photovoltaic module, by acting in particular on the vibration amplitudes of the multilayer alone (independently of the frame/support in which it is housed).

The features set forth in the following paragraphs can optionally be implemented, independently of each other or in combination with each other:

The at least one anti-vibration device furthermore forms a damping mass-spring subsystem. The mass, natural frequency, and level of damping of said anti-vibration device are thus quantities associated with the mass-spring damping subsystem.

The mass of said at least one anti-vibration device furthermore is less than the total mass of said photovoltaic module, by a factor of at least 5. The objective is not to increase the weight of the photovoltaic module considerably. The at least one anti-vibration device must therefore have sufficient mass to ensure damping the module without deforming it.

The at least one anti-vibration device furthermore has a natural frequency equal to the natural frequency of vibration of the fundamental mode of said photovoltaic module, to within 15%. As the vibrations undergone by the photovoltaic module manifest mainly as the fundamental mode, an anti-vibration device targeting the fundamental mode of the module would be the most effective.

The at least one anti-vibration device furthermore is fixed to the center of a surface of the multilayer. The objective is in fact to act as close as possible to the antinode of the photovoltaic module when the module is vibrating in its fundamental mode.

At least one of said devices furthermore comprises:
a mass,
a natural frequency equal to a natural frequency of vibration of a harmonic of said photovoltaic module, to within 15%,
a level of damping equal to at least twice the level of damping of said photovoltaic module considered on its own.

In effect, in addition to the fundamental mode, the anti-vibration device can also target a harmonic, also referred to as a higher-order mode. To do this, the natural frequency of the anti-vibration device must be adjusted to be as close as possible to the frequency of the targeted harmonic.

In this latter embodiment targeting the harmonics of the photovoltaic module, furthermore the mass of said anti-vibration device is less than the total mass of said photovoltaic module by a factor of at least 5, analogously to the case of fundamental mode.

The anti-vibration device furthermore is able to be fixed at a distance from the center of a surface of the multilayer. Indeed, if the anti-vibration device in question targets the fundamental mode of the photovoltaic module, it can be placed in its center but also at a distance from this center for reasons concerning attenuation optimization or environmental constraints, if the center of the module is not accessible for example. In the case where the anti-vibration device in question targets a harmonic, the device is generally at a distance from the center of the photovoltaic module.

The anti-vibration device furthermore can be fixed to a junction box, said junction box itself being fixed to the multilayer. Integration of the anti-vibration device into the photovoltaic module is thus facilitated by its addition, by juxtaposition or direct integration into an existing part of the module, here the junction box. Most photovoltaic modules have at least one junction box.

BRIEF DESCRIPTION OF DRAWINGS

The invention will be better understood upon reading the following detailed description, given solely by way of example and made with reference to the appended Figures, in which.

DETAILED DESCRIPTION

Figure 1:
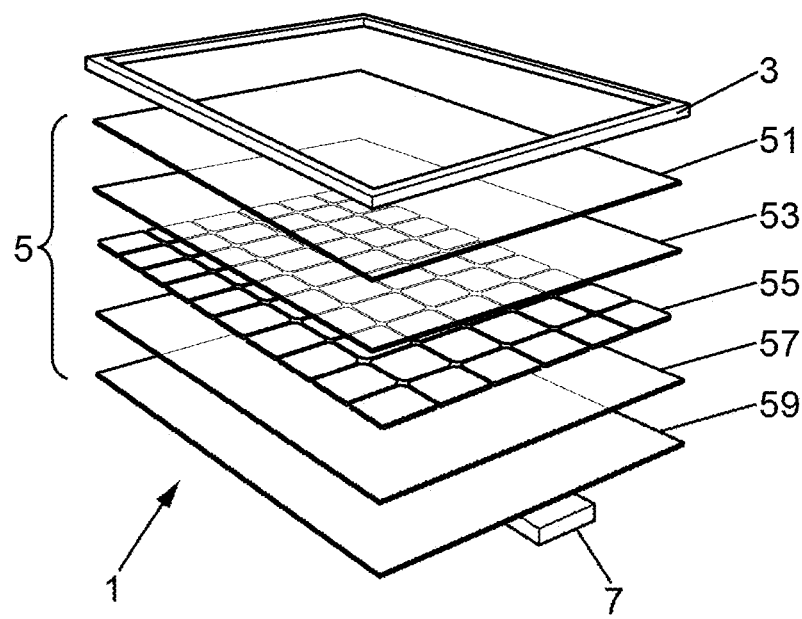
FIG. 1 shows the general structure of a photovoltaic module.

Reference is now made to [FIG. 1]. A photovoltaic module 1 comprises a frame 3 housing a multilayer 5, and a junction box 7 fixed to a rear face of multilayer 5. Multilayer 5 for its part comprises a stack, consisting here of (from a front face exposed to the sun, to a rear face opposite to the front face):
 a glass plate 51;
 a front protective layer 53 ("encapsulant");
 an array 55 of photovoltaic cells;
 a rear protective layer 57 ("encapsulant");
 a back sheet 59 (which could be replaced by a rear glass plate).

Photovoltaic module 1 represented in [FIG. 1] corresponds for example to a model having the commercial reference PW2450F marketed by the Photowatt company or having the reference C6K-270P from the manufacturer Canadian Solar.

Multilayer 5 has a generally flat shape, here rectangular. The composition of multilayer 5 described above constitutes one exemplary embodiment. The nature and number of layers may vary.

Because multilayer 5 is a mechanical part, it also has dynamic properties. It can in particular begin vibrating according to different modes called natural modes, these modes each being associated with natural frequencies.

Multilayer 5 therefore has at least one fundamental natural (vibration) frequency. This fundamental natural frequency depends on the structure, composition, and dimensions of multilayer 5, as well as on the assembling together of the component layers. The natural frequency(ies) of multilayer 5 can be determined by conventional laboratory tests using the theory described for example by Christian Pertersen and Horst Werkel in the book Dynamik der Baukonstruktionen (2017, ISBN: 978-3-8348-1459-3).

In addition to the natural frequency f (in s 1 or Hz), one can also define the natural pulsation w of a vibration mode, proportional to the natural frequency according to the expression:

[Math. 1]

$$w = 2\pi f$$

Frame 3 can be arranged all around multilayer 5 in order to protect its edges.

Junction box 7 has the function of electrically protecting the array of photovoltaic cells 55 of multilayer 5 by means of several bypass diodes. It also allows connecting the internal circuit of module 1 to output cables, enabling a step-by-step connection between different modules. Alternatively, photovoltaic module 1 can include several junction boxes capable of being fixed to several locations on the rear side of multilayer 5: for example, for a photovoltaic module referred to as a half-cell module, the rear face of multilayer 5 has at least three junction boxes 7, one of which is said to be central, i.e. fixed in the middle of the rear surface of multilayer 5.

The rear face of multilayer 5 can also have a central reinforcement bar, used to strengthen the mechanical resistance of multilayer 5 as a whole with respect to frame 3.

In the embodiments which follow, numerical values and value intervals are given as non-limiting examples.

Figure 2:
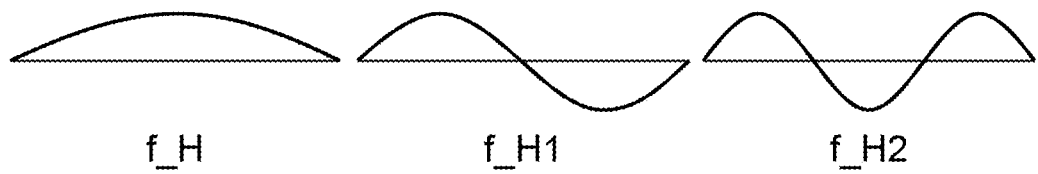
FIG. 2 shows an illustration of the principle of natural modes on a vibrating string.

With reference to [FIG. 2], the vibrational behavior of photovoltaic module 1 is similar to that of a vibrating string. Among the natural vibration modes of photovoltaic module 1, we distinguish fundamental mode, of fundamental natural frequency f_H, of natural pulsation w_H, and the harmonics, or higher-order natural modes, of natural frequencies f_H1, f_H2 etc., of respective natural pulsations w_h1, w_h2 etc. [FIG. 2] shows an example of a fundamental mode and two harmonics, the amplitude here being arbitrary and having no quantitative value. When photovoltaic module 1 vibrates in each natural vibration mode, certain portions of the part move more than others (these are the antinodes), which can be observed at the concave or convex portions of [FIG. 2]. Other portions of photovoltaic module 1 barely move (these are the vibration nodes), which corresponds to the points where the curves intersect with the horizontal segment in [FIG. 2].

When external excitation is applied to a frequency substantially close to one of these natural frequencies f_H, f_H1, f_H2 etc. (i.e. when the natural vibration modes of photovoltaic module 1 are excited), photovoltaic module 1 (and more particularly multilayer 5) vibrates with increasing amplitudes: this is the resonance phenomenon.

From a dynamic point of view, the vibrational behavior of photovoltaic module 1 according to one or more natural modes is equivalent to that of a mass-spring damping system, which is a mechanical system with a degree of freedom comprising a mass, a spring (or other return member) of stiffness constant k, and a damper. In particular, the mass, called the modal mass, corresponds to the equivalent mass for giving the mass-spring system the same natural frequency as that of the natural mode of the mechanical part (here photovoltaic module 1).

In other words, a mass-spring system having a natural frequency of vibration f and an adapted modal mass M has the same vibratory behavior as the natural vibration mode of natural frequency F of a photovoltaic module 1.

The natural frequency f, the modal mass m, and the stiffness constant k are connected according to the equation:

$$f = \frac{1}{2\pi}\sqrt{\frac{k}{m}}$$ [Math. 2]

It is particularly useful to specify that the modal mass of a photovoltaic module 1 differs from its total mass. Indeed, the modal mass of module 1 is associated with a natural mode (and therefore with a corresponding natural frequency) and is defined as the mass of photovoltaic module 1 which is set in motion when photovoltaic module 1 vibrates according to this natural mode.

Figure 3:
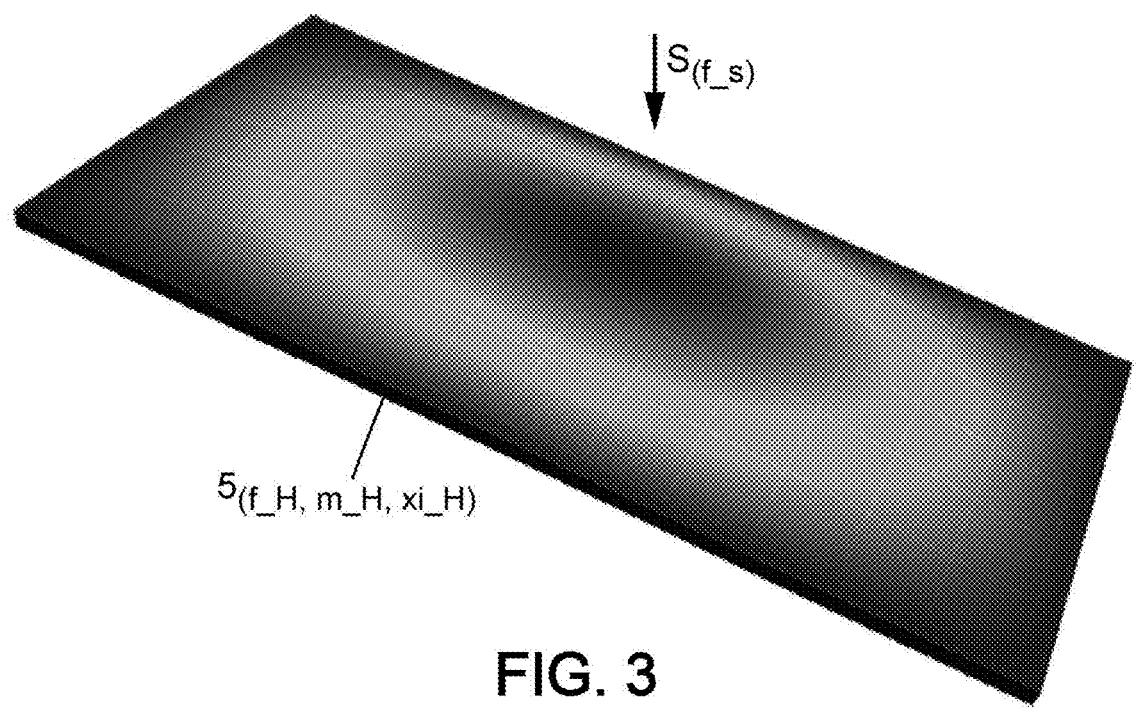
FIG. 3 shows the surface of a photovoltaic module and the vibration zones of the fundamental mode.

With reference to [FIG. 3], when photovoltaic module 1 vibrates, in particular in its fundamental mode of natural frequency f_H, the middle of multilayer 5 undergoes a deformation of particularly large amplitude in the direction perpendicular to the main plane of multilayer 5. Such a deformation when in fundamental mode corresponds to a displacement of a modal mass, which can represent approximately 60% of the total mass of photovoltaic module 1. This deformation is propagated throughout multilayer 5, which therefore contains highly deformed zones in the center of multilayer 5 and zones that are less and less deformed as the deformation propagates towards the periphery of multilayer 5.

A modal analysis of standard photovoltaic modules shows that the fundamental mode of vibration of a photovoltaic module 1 is a mode referred to as "drum" mode, whose natural frequency f_H is between 10 Hz and 20 Hz.

Calculations show in particular that the chance of vibration linked to gusts of wind or other environmental disturbances is mainly associated with the fundamental mode of vibration of photovoltaic module 1. Indeed, the higher-order modes have negligible modal masses. It is therefore in fundamental mode that photovoltaic module 1 is likely to vibrate at very high amplitudes which can considerably damage photovoltaic module 1 and its performance.

In one embodiment, it is therefore the vibrations of the fundamental mode of photovoltaic module 1 which preferably must be attenuated.

As a non-limiting example, we consider a photovoltaic module 1 as shown in [FIG. 3] having a total mass M_H=24 kg and a glass thickness of 3.2 mm. The fundamental mode of vibration of photovoltaic module 1 has a natural frequency f_H=10 Hz, which corresponds to a modal mass m_H=15 kg, i.e. nearly 60% of the total mass M_H of photovoltaic module 1. Photovoltaic module 1 also has higher-order vibrational frequencies f_H1=15 Hz and f_H2=23 Hz, which present negligible respective modal masses. A level of damping of xi_H=1% for these first modes of photovoltaic module 1 is also measured, there being very little damping of photovoltaic module 1 itself in the absence of an anti-vibration device.

We consider here that photovoltaic module 1 is subjected to an external excitation s, such as gusts of wind (or vibration due to transport). The excitation has an average frequency f_s of between 0.4f_H and 1.6f_H and a pulse w_s. Such a frequency therefore sweeps across the natural frequency of the fundamental mode f_H of photovoltaic module 1. It is therefore the fundamental mode of photovoltaic module 1 which is excited. This excitation is exerted perpendicularly to the main plane of module 1. Since the variations in the dynamics of wind are slow compared to the vibration frequencies of photovoltaic module 1, it is reasonable to consider that such excitation is temporarily a harmonic of frequency f_s. To normalize the amplitude of the dynamic response, it is assumed that, in the absence of inertia of photovoltaic module 1, the excitation would exert a static and uniform pressure s on the front face of module 1, which would cause deflection of about 1 millimeter at the center of multilayer 5.

Such excitation s causes resonance of photovoltaic module 1. We are interested in the fundamental mode of the vibratory behavior of photovoltaic module 1, and therefore in the resonance at the fundamental frequency f_H of photovoltaic module 1.

In this embodiment, the vibratory behavior of photovoltaic module 1 can be modeled by a mass-spring system of frequency f_H and modal mass m_H which are equivalent to those of the fundamental mode.

In this embodiment, the fluctuating pressure exerted by the wind on photovoltaic module 1 leads to significant deformation of module 1, this deformation denoted y constituting a dynamic response—or dynamic amplification—y/s of photovoltaic module 1.

In this embodiment, only the vibrations linked to the fundamental mode of the vibratory behavior of photovoltaic module 1 are considered. The maximum amplitude of multilayer 5 in the fundamental mode of photovoltaic module 1—i.e. at the vibration antinode of the fundamental mode of multilayer 5—is therefore located at the center of multilayer 5. Usually, a junction box 7 (referred to as being "central") is precisely arranged at the center of multilayer 5 within the frame of reference of the main plane of multilayer 5, and fixed on the rear face thereof. In preferred embodiments, an anti-vibration device 2 is fixed to a central junction box 7. Thus, anti-vibration device 2 is located in a zone of module 1 where it is particularly effective, without this involving a direct attachment in contact with multilayer 5.

Figure 4:
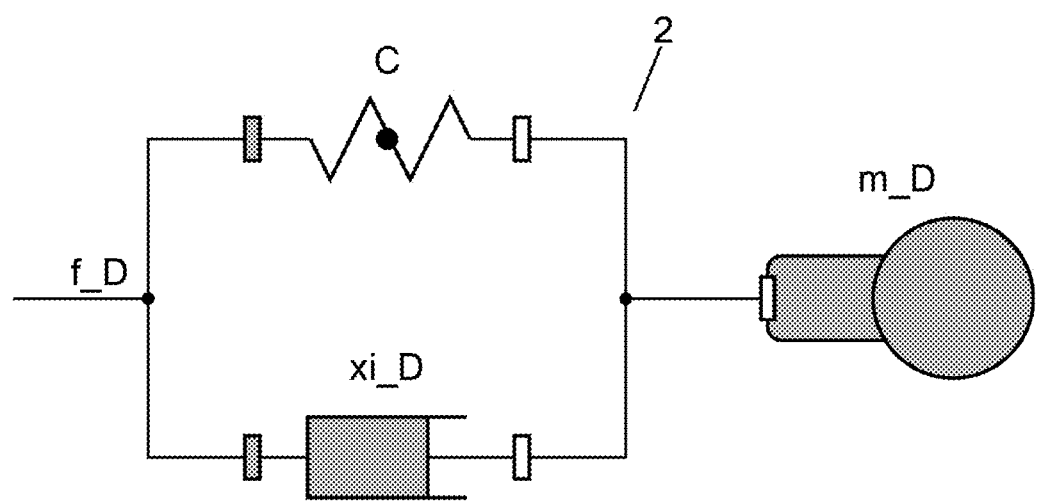
FIG. 4 shows an anti-vibration device suitable for attachment to a photovoltaic module.

With reference to [FIG. 4], an anti-vibration device 2 (or damping device) able to be fixed on a photovoltaic module 1 is considered.

This anti-vibration device 2 is a mass-spring system which comprises:
- a mass m_D=0.6 kg, which is therefore low compared to the total mass of module 1 ("low" is understood here to mean that it has little influence on the handling of the modules, for example less than 20%, or even 10%, of the mass of module 1);
- a spring, having a stiffness constant c=30 N/m;
- a damper, having a level of damping xi_D=30%, which is therefore much greater than the natural damping xi_H of photovoltaic module 1 ("much greater" is understood here to mean more than 2 times, preferably 5 times, the natural damping xi_H; and natural damping is understood to mean the damping of multilayer 5 when bare).

In the example described here, anti-vibration device 2 has a natural frequency f_D=10 Hz, equal in this embodiment to that of photovoltaic module 1 itself. Anti-vibration device 2 corresponds to a damping mass-spring system whose natural frequency of vibration f_D corresponds to the natural frequency of vibration of the fundamental mode f_H of photovoltaic module 1. Alternatively, anti-vibration device 2 can target the fundamental mode of the vibratory behavior of photovoltaic module 1 by having a natural frequency f_D equal to the natural frequency of vibration of the fundamental mode f_H of photovoltaic module 1 to within 15%.

The mass m_D of anti-vibration device 2 is less than the total mass M_H of photovoltaic module 1, by a factor of at least 5.

A ratio is defined between the mass m_D of anti-vibration device 2 and the modal mass m_H of photovoltaic module 1, for a given mode, here considered to be the fundamental mode:

$$\mu = \frac{m\_D}{m\_H} \quad [\text{Math. 3}]$$

In the example described here, the mass m_D of anti-vibration device 2 is chosen to be lower than the total mass M_H of photovoltaic module 1, by a factor of 40. Thus, although the damping capacity xi_H of anti-vibration device 2 increases with its mass m_D, the total mass of module 1 including anti-vibration device 2 remains moderate. Handling of the modules 1 remains easy. In situations where the module is very light, around 5 kg, anti-vibration device 2 can have a mass of around half a kilo, leading to a ratio of 10. Such modules are for example marketed under the references "SMDDW", "SMADW", and "SMDUW" from the "SUNMAN" company.

Similarly to the rest of module 1 and to multilayer 5, anti-vibration device 2 moves under the pressure exerted by the wind, this displacement z leading to a dynamic response—or dynamic amplification—z/s of anti-vibration device 2 itself in response to a harmonic excitation s.

Figure 5:
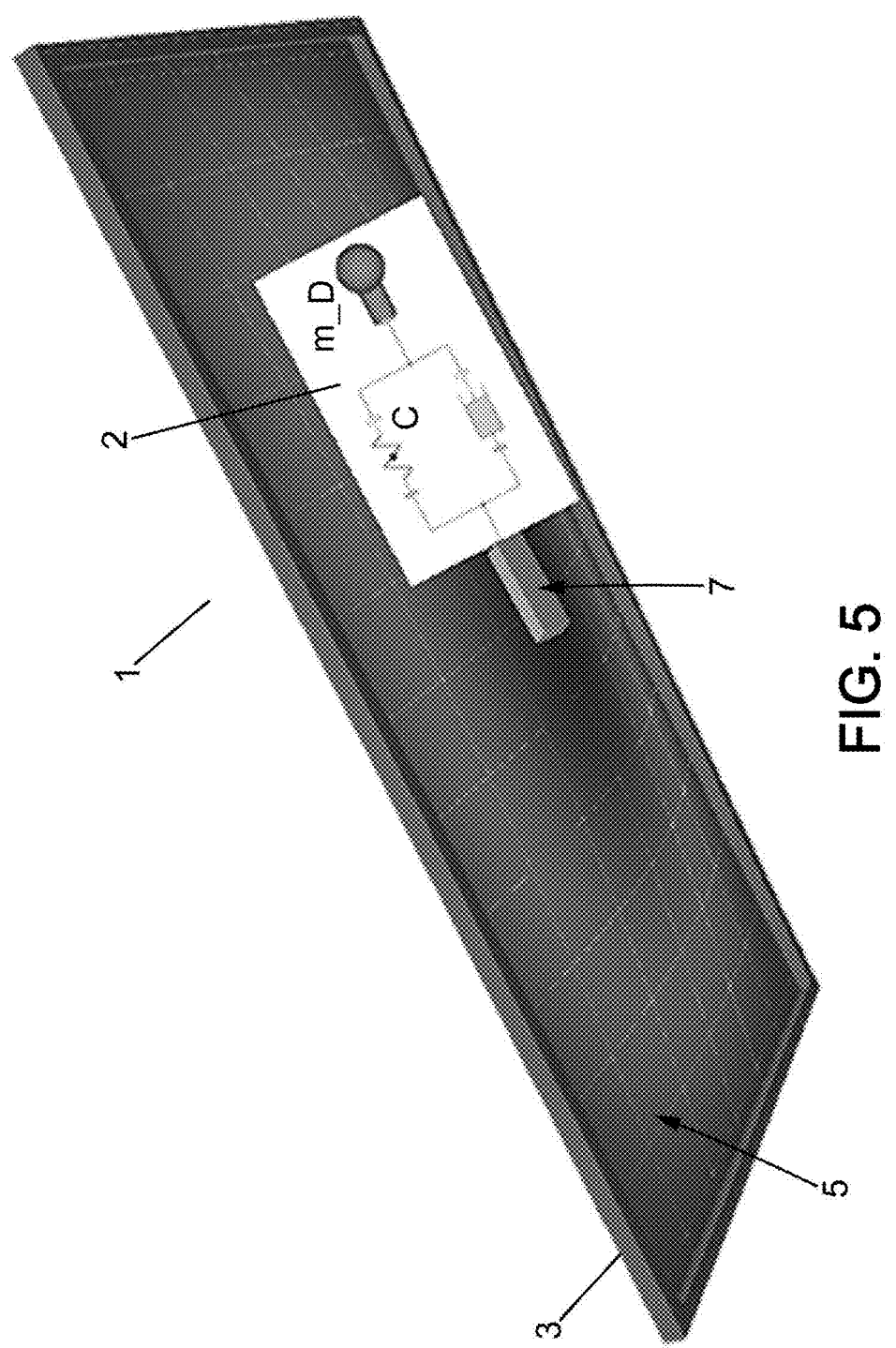
FIG. 5 shows a photovoltaic module to which is fixed an anti-vibration device added to the junction box according to one embodiment.

With reference to [FIG. 5], we consider multilayer 5 on which anti-vibration device 2 is fixed. In the embodiment described here, the anti-vibration device is fixed to junction box 7.

Anti-vibration device 2 can be fixed in a housing attached to junction box 7 using glue, adhesive tape, a clip to frame 3, or by welding. Alternatively, anti-vibration device 2 can be integrated into junction box 7, for example housed inside the latter.

In the example described here, anti-vibration device 2 is arranged to attenuate the effects of the fundamental mode of vibration of multilayer 5. Junction box 7 on which anti-vibration device 2 is fixed is therefore the one located at the center of the rear surface of module 1.

Photovoltaic module 1 equipped with anti-vibration device 2 is equivalent to a damping mass-spring system with a natural frequency and a mass, and in particular having a much greater damping capacity than photovoltaic module 1 when bare.

Multilayer 5 provided with anti-vibration device 2 deforms under the pressure exerted by the wind, this deformation v leading to a dynamic response—or dynamic amplification—referred to as v/s, of module 1 to which a damping device 2 has been added, in response to a harmonic excitation s.

Figure 6:
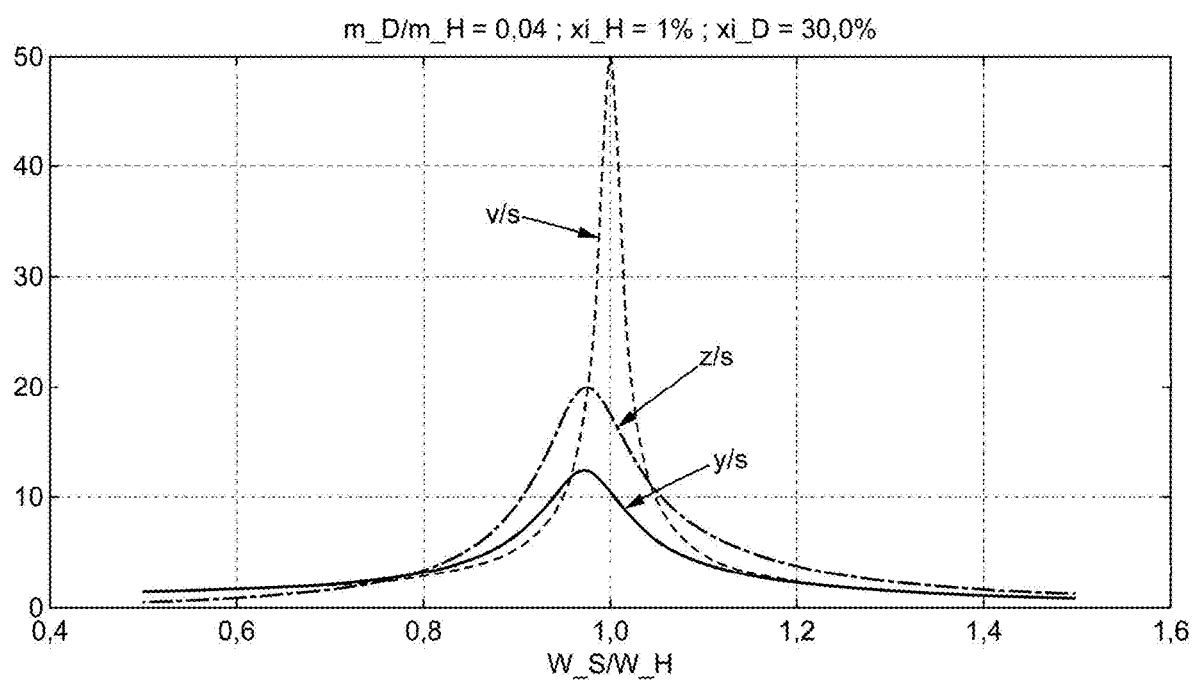
FIG. 6 shows a comparative graph of the vibrational responses of various assemblies.

With reference to [FIG. 6], using the open source software Code Aster ("Code_Aster, EDF R&D, general code for studying the mechanical behavior of structures, distributed under the GNU GPL license, http://www.code-aster.org"), simulation results are observed in the form of a harmonic response graph of the dynamic system modeling photovoltaic module 1, following a harmonic excitation s. One will observe that, in the absence of damping device 2, the amplification y/s of photovoltaic module 1 itself, due to a vibration of amplitude equivalent to the static loading s and of a frequency substantially similar to the fundamental natural frequency of photovoltaic module 1, is about 50. A deflection that would be 1 mm at the center of panel 1 can then, via an effect of dynamic amplification, reach up to 5 cm.

By means of an anti-vibration device 2 having dimensions suitable for multilayer 5 as described above, it is therefore possible to reduce the dynamic amplification y/s to a coefficient of about 12, which would correspond in the example described here to a maximum dynamic deflection of about 1.2 cm. The dynamic deformation of the module due to external excitation is therefore controlled and limited.

One will also note that anti-vibration device 2 has a dynamic amplification coefficient z/s of about 20. Optionally, it is possible to equip anti-vibration device 2 with abutments arranged to limit its deflection.

These various values having been given by way of non-limiting examples, a person skilled in the art can consider other design dimensions by referring to the following relative displacement equations:

$$\frac{y}{s} = \sqrt{\frac{\alpha^2 + \beta^2}{\gamma^2 + \delta^2}} \quad [\text{Math. 4}]$$

$$\frac{z}{s} = \sqrt{\frac{\theta^4}{\gamma^2 + \delta^2}} \quad [\text{Math. 5}]$$

where:

$$\theta = \frac{w\_S}{w\_H} \quad [\text{Math. 6}]$$

$$\alpha = \frac{w\_D^2}{w\_H^2} - \theta^2 \quad [\text{Math. 7}]$$

$$\beta = 2\theta \, xi\_D \frac{w\_D}{w\_H} \quad [\text{Math. 8}]$$

$$\gamma = \theta^4 - \theta^2 \left(1 + \frac{w\_D^2}{w\_H^2} + \mu \frac{w\_D^2}{w\_H^2} + 4 \frac{w\_D}{w\_H} xi\_H xi\_D\right) + \frac{w\_D^2}{w\_H^2} \quad [\text{Math. 9}]$$

$$\delta = \theta\left[\left(2xi\_H\left(\frac{w\_D^2}{w\_H^2} - \theta^2\right) + 2xi\_D\left(1 - \theta^2 - \mu\theta^2\right)\right)\right] \quad [\text{Math. 10}]$$

Alternatively, one or more other anti-vibration devices 2 can be attached to the rear face of photovoltaic module 1, supplementing or replacing central anti-vibration device 2 described above. Anti-vibration devices 2 each have:
- a mass,
- a natural frequency equal to a natural frequency of vibration of a harmonic of photovoltaic module 1 to within 15%,
- a level of damping equal to at least 5 times the level of damping of the frequency of module 1 considered on its own.

In such embodiments, anti-vibration devices 2 are arranged to reduce the effects of the higher-order natural modes of photovoltaic module 1 (other than fundamental mode). Each anti-vibration device 2 forms a damping mass-spring system having a suitable modal mass m_D and suitable natural frequency f_D, as well as a level of damping xi_D greater than that of photovoltaic module 1 itself.

In such embodiments, in the same manner as for the fundamental mode, the harmonics of photovoltaic module 1 can be controlled by placing damping devices 2 at the vibration antinodes of the higher-order modes of photovoltaic module 1. In particular, anti-vibration devices 2 corresponding to the higher-order natural modes can be placed at a distance from the center of the rear surface of module 1.

EXAMPLES

The following Table 1 summarizes the main characteristics of three types of photovoltaic modules 1 of three different generations, as well as the optimized characteristics of an anti-vibration device 2 of mass m_D=0.5 kg. The last column shows the reduction factor of the dynamic response to the resonance of photovoltaic module 1. This factor is an indicator of the effectiveness of anti-vibration device 2. One will note in particular that anti-vibration device 2 is all the more effective when the ratio of its relative mass m_D to the modal mass m_H of the panel (corresponding to factor $\mu$) is larger.

TABLE 1

| Type of photovoltaic panel | M_H (kg) | Fundamental frequency (Hz) | Modal mass (kg) | 100 × μ (%) | Optimized frequency (Hz) | Optimized damping (%) | Reduction in amplitude of response |
|---|---|---|---|---|---|---|---|
| 60 cells 125 × 125, glass 3.6 mm | 19.8 | 12.5 | 11.9 | 2.5 | 12 | 12 | 5.4 |
| 60 cells 154 × 154, glass, 3.2 mm | 18 | 11.2 | 10.8 | 2.8 | 10.7 | 12 | 6.3 |
| 72 cells, glass, 3.2 mm | 24.2 | 10.3 | 14.2 | 2 | 10 | 11 | 3.14 |

The use of anti-vibration device 2 makes it possible to reduce the amplitude of vibrations acting on photovoltaic module 1 as a whole, by acting directly on multilayer 5. Unlike known solutions, the invention is not based either on stiffening the photovoltaic module 1 nor on increasing its robustness.

These technical solutions can be applied to photovoltaic modules and power plants, in particular in locations where vibration phenomena can be significant: altitude, presence of strong gusts of wind, etc.

The anti-vibration devices can be added to existing conventional modules.

In addition, the anti-vibration device allows a more economical and ergonomic design of the modules, in particular with thinner solar cells. In other words, solar cells that are more fragile than in the prior art can be utilized because they are less subject to deformation, by the addition of anti-vibration devices.

An industrial application can be considered by manufacturers of photovoltaic modules, manufacturers of junction boxes for photovoltaic modules, photovoltaic installers responsible for designing power plants, or operators of photovoltaic power plants.

This disclosure is not limited to the embodiments and variants described above solely by way of example, but encompasses all variants conceivable to a person skilled in the art upon reading this document.

The invention claimed is:

1. A system comprising:
    a photovoltaic module including a multilayer housed in a frame, the photovoltaic module as a whole having a total mass, a modal mass, and a natural frequency of vibration;
    at least one anti-vibration device able to be fixed with respect to the multilayer, at least one of the at least one anti-vibration device having:
        a mass,
        a natural frequency equal to the natural frequency of vibration of said photovoltaic module considered on its own, to within 15%,
        a level of damping of the anti-vibration device considered on its own, equal to at least twice the level of damping of said photovoltaic module considered on its own.

2. The system according to claim 1, wherein the at least one anti-vibration device forms a damping mass-spring subsystem.

3. The system according to claim 1, wherein the mass of said at least one anti-vibration device is less than the total mass of said photovoltaic module, by a factor of at least 5.

4. The system according to claim 1, wherein the at least one anti-vibration device has a natural frequency equal to the natural frequency of vibration of the fundamental mode of said photovoltaic module, to within 15%.

5. The system according to claim 1, wherein the at least one anti-vibration device is fixed to the center of a surface of the multilayer.

6. The system according to claim 1, wherein at least one of said devices comprises:
    a mass,
    a natural frequency equal to a natural frequency of vibration of a harmonic of said photovoltaic module, to within 15%,
    a level of damping equal to at least twice the level of damping of said photovoltaic module considered on its own.

7. The system according to claim 6, wherein the mass of said anti-vibration device is less than the total mass of said photovoltaic module by a factor of at least 5.

8. The system according to claim 1, wherein said anti-vibration device is able to be fixed at a distance from the center of a surface of the multilayer.

9. The system according to claim 1, wherein the anti-vibration device can be fixed to a junction box, said junction box itself being fixed to the multilayer.

\* \* \* \* \*